United States Patent [19]

Fling

[11] Patent Number: 4,639,784
[45] Date of Patent: Jan. 27, 1987

[54] VIDEO SIGNAL RECURSIVE FILTER ADAPTIVELY CONTROLLED RESPONSIVE TO THE HISTORY OF IMAGE MOTION

[75] Inventor: Russell T. Fling, Fishers, Ind.

[73] Assignee: RCA Corporation, Princeton, N.J.

[21] Appl. No.: 702,612

[22] Filed: Feb. 19, 1985

[51] Int. Cl.$^4$ .............................................. H04N 5/21
[52] U.S. Cl. .................... 358/167; 358/166; 358/105
[58] Field of Search ............... 358/167, 166, 36, 37, 358/39, 105, 336, 340

[56] References Cited

U.S. PATENT DOCUMENTS

| | | | |
|---|---|---|---|
| 4,064,530 | 12/1977 | Kaiser et al. | 358/36 |
| 4,240,106 | 12/1980 | Michael et al. | 358/36 |
| 4,268,855 | 5/1981 | Takahashi | 358/36 |
| 4,275,418 | 6/1981 | Trump et al. | 358/167 |
| 4,296,436 | 10/1981 | Achina | 358/167 |
| 4,307,420 | 12/1981 | Ninomiya et al. | 358/136 |
| 4,485,403 | 11/1984 | Illetschko | 358/167 |
| 4,494,140 | 1/1985 | Michael | 358/167 |
| 4,500,911 | 2/1985 | Ninomiya | 358/167 |
| 4,539,594 | 9/1985 | Illetschko | 358/167 |
| 4,549,213 | 10/1985 | Illetschko | 358/36 |

FOREIGN PATENT DOCUMENTS 2138237 10/1984 United Kingdom .

*Primary Examiner*—Tommy P. Chin
*Attorney, Agent, or Firm*—E. M. Whitacre; P. J. Rasmussen; E. P. Herrmann

[57] ABSTRACT

A recursive filter for effecting noise reduction of video signals, sums current and delayed signals and includes a motion detector for detecting interframe image motion. Signal from the motion detector is stored to provide a history of image motion. A decoder coupled to the motion detector and also responsive to the stored motion history develops control sequences for scaling the signal contributions which form the recursive filter sums.

11 Claims, 6 Drawing Figures

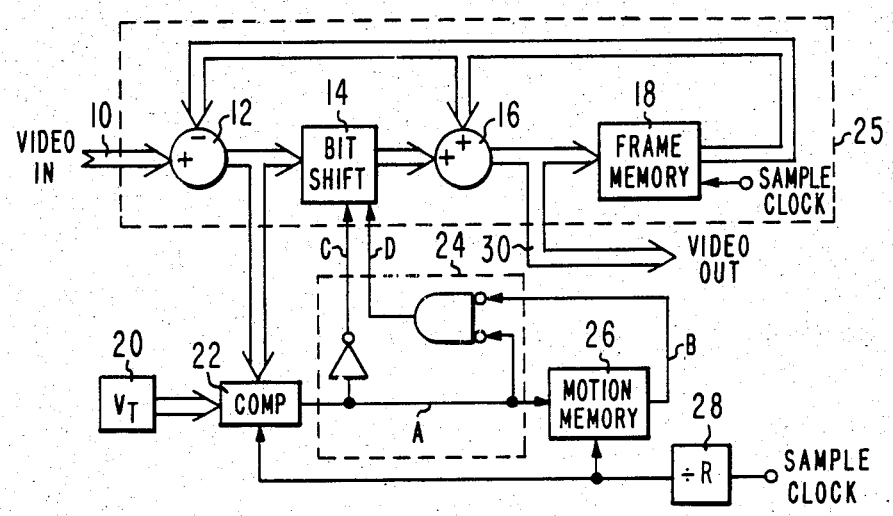
Fig. 1A
Fig. 1B
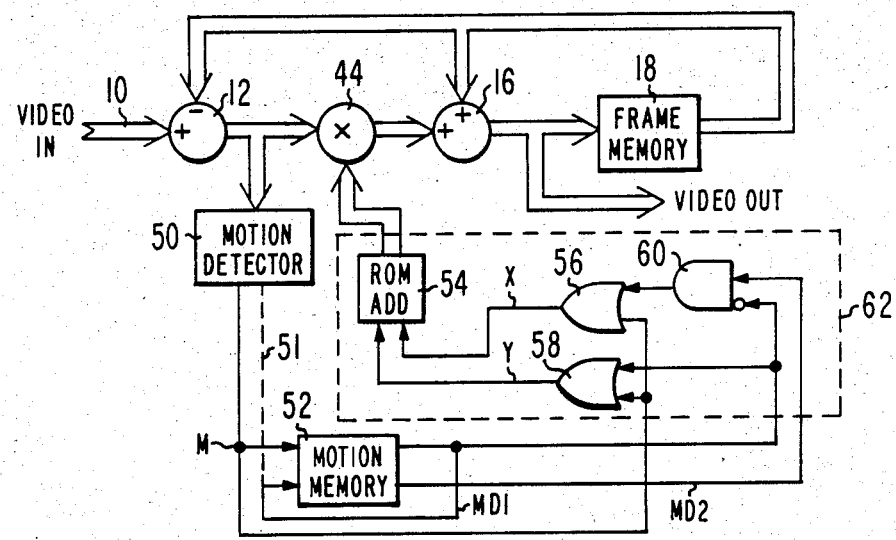
Fig. 2

| M | MD1 | MD2 | Y | X | K |
|---|---|---|---|---|---|
| 1 | 1 | 1 | 1 | 1 | 1 |
| 1 | 1 | 0 | 1 | 1 | 1 |
| 1 | 0 | 1 | 1 | 1 | 1 |
| 1 | 0 | 0 | 1 | 1 | 1 |
| 0 | 1 | 1 | 1 | 0 | 1/2 |
| 0 | 1 | 0 | 1 | 0 | 1/2 |
| 0 | 0 | 1 | 0 | 1 | 1/4 |
| 0 | 0 | 0 | 0 | 0 | 1/16 |

M    1 1 1 1 0 0 0 0 1 1 0 0 1 0 1 0 0 0 X X X

MD1  X 1 1 1 1 0 0 0 0 1 1 0 0 1 0 1 0 0 0 1 X

MD2  X X 1 1 1 1 0 0 0 0 1 1 0 0 1 0 1 0 0 0 1

K    1 1 1 1 1/2 1/4 1/16 1/16 1 1 1/2 1/4 1 1/2 1 1/2 1/4 1/16 1

TIME ──▶

VIDEO SIGNAL RECURSIVE FILTER ADAPTIVELY CONTROLLED RESPONSIVE TO THE HISTORY OF IMAGE MOTION

This invention relates to apparatus for the reduction of electrical noise in video signals.

It is known in the art of video signal processing that the signal-to-noise ratio of video signals may be enhanced by recursive filtering. A system employing this technique is described in U.S. Pat. No. 4,064,530. One of the embodiments disclosed in this reference includes a frame memory, an adder and a motion detector. Current video signal which is proportioned by a scale factor of $1/(N+1)$ and delayed video from the frame memory which is proportioned by the scale factor $N/(N+1)$ are summed in the adder and the resultant sums are stored in the frame memory. The values, N, in the scale factors, are determined on a sample by sample basis and correspond to the number of image frames from the last frame in which image motion was detected for the respective pixel. The information required to determine the respective N values is updated and stored on a frame basis in an auxilliary memory.

In the foregoing system, if motion for a particular pixel was last detected in the current, first, second, third, etc., lastmost frame periods, the scale factor $1/(N+1)$ assumes the values $1, \frac{1}{2}, \frac{1}{3}, \frac{1}{4}$, etc., respectively, and the scale factor $N/(N+1)$ assumes the values $0, \frac{1}{2}, \frac{2}{3}, \frac{3}{4}$, etc., respectively.

This method of creating a sequence of scale factors following the cessation of motion may appear to be elegantly simplistic. However, those skilled in the art of digital circuit design will realize that frame counters require a not insubstantial amount of hardware and that scaling circuits to divide by e.g. $\frac{1}{3}$, 1/5 requires significant hardware. In addition, while the scale factor sequences $1, \frac{1}{2}, \frac{1}{3}, \frac{1}{4}$ and $0, \frac{1}{2}, \frac{2}{3}, \frac{3}{4}$ may provide acceptable noise reduction, they may not provide the best response in a multipurpose recursive filter.

It is an object of the present invention to provide a motion adaptive recursive filter having a minimum of hardware elements.

It is a further object of the invention to configure the motion adaptive elements of a recursive filter to provide an arbitrary sequence of scale factors.

SUMMARY OF THE INVENTION

The present invention includes a recursive filter for processing video signal wherein current and stored video signals are proportioned and summed as a function of interimage motion. The recursive filter includes a motion detector and storage means for storing information relating to the history of motion of image pixels. A decoder responsive to the stored motion information and the motion detector is arranged to select predetermined scale factors for proportioning the current and stored video signals.

BRIEF DESCRIPTION OF THE DRAWING

FIG. 1A is a block diagram of a recursive filter according to the present invention, and FIG. 1B is a truth table for the logic element 24 of FIG. 1A.

FIG. 2 is a block diagram of an alternate embodiment of a recursive filter according to the present invention.

DETAILED DESCRIPTION

Figures 3, 4, 5:
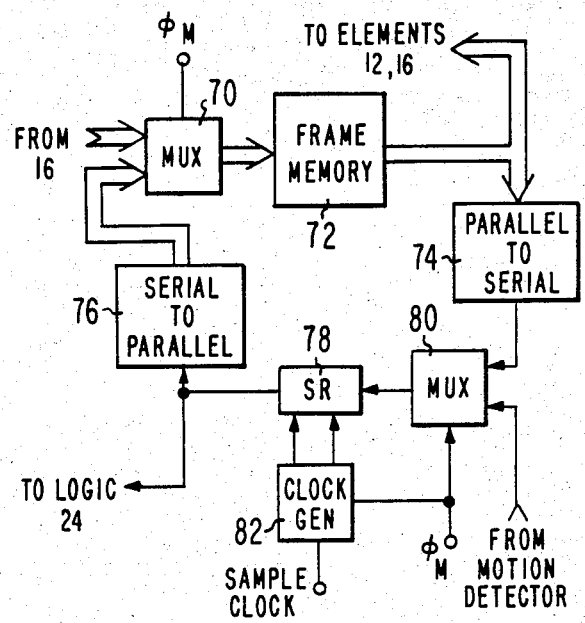
FIG. 3 is a truth table for the logic element 62 of FIG. 2.
FIG. 4 is a state table for a particular occurrence of motion of a particular image pixel with the signal scaling factor that is applied to the scaling element 44 of FIG. 2.
FIG. 5 is a block diagram of an alternate motion history memory arrangement.

In the figures, broad arrows interconnecting elements are multiconductor connections for coupling multibit digital values. Narrow arrows represent single conductor connections. Elements in the different drawings designated with like numerals are similar or equivalent devices.

Referring to FIG. 1A, the circuit elements circumscribed by the broken line 25 form a recursive filter. Signal to be filtered is applied at input bus 10 and recursively filtered signal is available at output bus 30. New video data is applied to the minuend input port of subtracter 12 and old or signal delayed by precisely one frame period from frame memory 18 is applied to the subtrahend input port of subtracter 12. The difference generated by subtracter 12 represents image movement from frame to frame. The difference value is applied to a scaling circuit 14 wherein it is scaled by a factor $K=1-S$ where S is less than one. The scaled difference value is then added to the stored video signal from frame memory 18 in adder 16, the output of which represents noise reduced video.

It can be shown that for video signal without interframe motion, the video output signal is equal in amplitude to the video input signal. The noise component on the other hand is reduced, with the noise reduction factor tending toward $\sqrt{(1-S)/1+S}$ after several frame periods.

The recursive filter averages current and delayed video signal to increase the signal-to-noise ratio. When image motion occurs the averaging process has the effect of reducing signal bandwidth as well as to create undersirable artifacts in the reproduced image. Thus, during motion periods it is preferable to pass the input signal directly to the output 30 rather than attempting to realize noise reduction. This is effectively accomplished by setting the scale factor K to equal 1. After interframe motion ceases, the system is conditioned to revert to recursive filtering by decreasing the value of the scale factor K. It has been found that to achieve good noise reduction quickly, the value K should be decreased in steps over several frame periods. For example, during the first, second and third frames immediately following the cecession of motion K may be sequenced through the values $\frac{1}{2}, \frac{1}{4}$ and $\frac{1}{8}$. To accomplish the sequencing of the values for the scale factor, K, the history of motion for the image pixels must be available. This implies detecting when motion occurs and storing the information.

Referring again to FIG. 1A, the instantaneous output from subtracter 12 represents the difference between the current pixel and the same pixel one frame period earlier. If any difference is present it is an indication that the scene changed i.e., interimage motion occurred.

The difference signal from subtracter 12 is applied to a comparator 22, which, in this example, develops a logic 1 value at its output connection, A, if the difference exceeds a threshold value $V_T$. Comparing the differences against a threshold value provides a degree of noise immunity in the motion signal generated by the comparator. The threshold value is shown supplied from a source 20, but it will be appreciated that the element 20 may be designed to have an inherent threshold $V_T$. It will also be appreciated that the comparator 22 (or threshold detector) should be bipolar, i.e. the logic one output is developed for the difference being greater than $V_T$ or less than $-V_T$. For difference values between plus and minus $V_T$, comparator 22 produces a zero logic level.

The comparator 22 output signal is applied to a memory element 26 containing one-bit storage cells which correspond to signal storage cells in the frame memory 18. The inputting and outputting of data to memory 26 from comparator 22 is synchronous with the inputting and outputting of corresponding video pixel data to memory 18.

Output bits from memory 26 at connection B are delayed one frame period. The memory 26 input and output data is applied to a logic element 24. Logic element 24 produces a two-bit output on connections D and C. The function of logic element 24 is described by the truth table of FIG. 1B.

From the truth table it may be seen that if motion exists between the current pixel and the same pixel one frame earlier (A=1) the logic element 24 generates a 00 output on lines DC regardless of the value output by memory 26. If there is no current motion (A=0), but motion existed at the pixel one frame earlier (B=1), element 24 generates an 01 output. Finally, if there is no current motion (A=0), and no motion occurred at the pixel one frame earlier (B=0), element 24 generates the logic output 11 on lines DC.

The output, DC, from logic element 24 is coupled to control input terminals of scaling circuit 14. In this embodiment scaling circuit 14 is a bit shifter such as a barrel shifter which shifts the bit significance of the applied difference values from subtracter 12. Scaling circuit or bit shifter 14 shifts the difference sample bits rightward to effect a division by $2^n$ where n corresponds to the number of bit positions by which a parallel bit sample is shifted. The value of the exponent n may be made to equal the binary value represented by the logic levels from the logic element 24 output connections DC. In this instance the scale factor developed in scaling circuit 14 equals 1 for current motion; $\frac{1}{2}$ for no current motion but motion one frame earlier; and $\frac{1}{8}$ for no current or previous motion. It will of course be recognized that bit shifter may be arranged such that the value n may have a different correspondence to the binary control values on lines DC or that different logic may be implemented in logic element 24.

For example, logic element 24 may consist of a ROM having an address input port coupled to the data input and output terminals of memory element 26, and a data output port coupled to the control input port of bit shifter 14. The address locations in the ROM would be programmed with appropriate control codes to provide the desired scale factors in accordance with the motion history information applied to the address input port.

In typical digital video signal processing systems, the video samples occur at a four times color subcarrier rate. Thus, the video samples are clocked through the frame memory 18 at this rate under control of a sample clock. However, it may not be necessary to motion detect at this rate. Motion detection may be performed on every $R^{th}$ sample. The size of the motion memory can therefore, be reduced by the factor R. The ramification of the reduced motion detection rate is that the same scaling factor is applied to R successive samples.

This produces little observable difference in reproduced images between the value of R=1 and R equal to some small integer, e.g. 4.

In FIG. 1A, a frequency divider 28 reduces the sample clock rate by R to generate a serial clock to control the motion memory 26. This clock is also applied to the comparator 22 to provide comparator output signals for every $R^{th}$ pixel which have a duration of R pixel periods.

The selection of the values for the sequence of scale factors that are applied to the scaling circuit postmotion is determined by the function that the filter system is desired to perform. Noise reduction is an obvious function. However, other functions may be simultaneously included. One such function may be the substantial separation of the luminance or chrominance component of video signal from a composite video input signal.

If composite video signal that is delayed by one frame period is additively combined with current composite video signal, the luminance component thereof adds constructively and the chrominance component, which is 180 degrees out of phase frame-to-frame (NTSC signals) cancels. Designating the input video on bus 10 as $V_{NEW}$, output video on bus 30 as $V_{OUT}$, and delayed video from frame memory 18 as $V_D$ it can readily be shown that $$V_{OUT}=KV_{NEW}+(1-K)V_D. \tag{1}$$

Thus, when K=1, i.e. during motion periods, $V_{OUT}$ is equal to $V_{NEW}$ and current video is input to the frame memory 18.

When motion ceases, current video at the input bus 10 and delayed video from frame memory 18 should be 100 percent correlated. If the K factor is changed from the value one to the value one-half, adder 16 will produce the luminance component on output port 30 for the first frame in which the K factor is set at one-half. During the next frame the delayed video from memory 18 will be this luminance component. For this next frame period, if the scale factor is greater than zero, the delayed luminance will be combined with current composite video and the output signal will be contaminated with chrominance. To preclude such contamination, the scale factor must be set to zero following the first frame that it was set to one-half after the cessation of motion.

However, if the sequence of scale factors for motion, one frame after motion, and succeeding frames, is 1, $\frac{1}{2}$, and 0 respectively, so that luminance may be separated from composite video, the system will not provide significant noise reduction. On the other hand if the sequence is selected to be 1, $\frac{1}{2}$, $K_n$, $K_n$, $K_n$ where $K_n$ is a small value, a relatively high degree of noise reduction will be realized and luminance can be separated from composite video with chrominance substantially eliminated.

Those skilled in the art of recursive filter design will realize that for the sequence of scale factors of 1, $\frac{1}{2}$, $K_n$, $K_n$ where $K_n$ is small, a relatively large number of frames must be processed in order to realize the potential noise reduction. To more rapidly realize the potential noise reduction at the expense of slightly more chrominance contamination a different compromise sequence of scale factors may consist of 1, $\frac{1}{2}$, $\frac{1}{4}$, $K_n$, $K_n$, $K_n$ . . . In either case the small valued scale factor $K_n$ must be applied after very few frame periods. This is not achieved by a system which decreases the scale factor monotonically, i.e., accordig to the function 1/N or 1/(N+1) where N is incremented by one for each succeeding frame period. For the system to be effective, the values of the scale factors must be arbitrarily selectable. That is, the value of each scale factor in the sequence of scale factors applied post-motion should be chosen to optimize the system in some respect.

Note that the discussion refers to changing the scale factor on a frame basis, however, it is to be understood that the scale factor is determined on a frame basis for each pixel and in general is not constant over a frame period.

FIG. 2 is an alternate embodiment to the FIG. 1A recursive filter. In FIG. 2, however, the motion memory and motion logic is arranged to accommodate two bits per pixel of motion history information. Having two-bit motion information available allows the generation of a more sophistocated sequence of scale factors after the cessation of pixel motion.

Video signal differences from subtracter 12 are coupled to a motion detector 50, which may be similar to elements 20 and 22 of FIG. 1A. Output signal, M, from the motion detector 50 is applied to one input of motion memory 52 and is output from the motion memory 52 as signal MD1 delayed by one frame period. The delayed output MD1 is coupled to a second input of memory S2 wherein it is delayed by a second frame period and output as signal MD2.

Signals M, MD1 and MD2 indicate the status of motion of respective pixels for the current, first and second lastmost frame periods. These signals are applied to exemplary logic element 62 having the logic function defined by the truth table illustrated in FIG. 3.

Logic element 62 consists of gates 56, 58 and 60 responsive to signals M, MD1 and MD2, which generate two-bit addresses XY. The address codes are applied to the address input port of a ROM 54 which is programmed to produce appropriate scale factors for the XY address codes. The scale factors from ROM 54 are applied to the scaling circuit 54 which may be a multiplier, or alternatively a bit shifter as in FIG. 1A. An alternate ROM having a three-bit address input port may be coupled directly to connections M, MD1 and MD2 in lieu of logic gates 56, 58, 61.

FIG. 4 is a timing diagram corresponding to points in the FIG. 2 circuitry and the truth table of FIG. 3. In FIG. 4 the rows designated M, MD1 and MD2 contain successive arbitrary logic states for a particular pixel. The row designated K illustrates the scale factors which are produced by ROM 54, for the combination of logic states vertically above the respective scale factor.

The exemplary motion logic illustrated in FIGS. 1A and 2 and the associated truth tables of FIG. 1B and FIG. 3 define systems which rapidly reduce the scale factor to a small value to satisfy the requirements of effective luminance separation and good noise reduction.

An alternate system for the FIG. 2 circuitry is indicated by the broken line connection 51 between motion detector 50 and motion memory 52. In this embodiment the motion detector 50 is presumed to provide a two-bit output on connections M and 51. The logic states of the two-bit output from detector 50 may indicate the relative probability that motion has occurred. Depending upon these probability values the logic element generates the appropriate scale factors.

The motion detector in this instance may consist of two comparators (like elements 20 and 22 of FIG. 1A) connected in parallel, and having two different threshold values. The two single bit outputs from the parallel connected comparators will form the two-bit output, i.e. connections M and 51. (Note in this arrangement memory output MD1 is not fed back to the second input of memory 52).

In both the FIG. 1A and FIG. 2 embodiments it may be necessary to include compensating delays between certain elements to accommodate processing delays. For example, a delay may be required between the subtracter 12 and the scaling circuit 14 to compensate for delays in the motion detector and the logic element. Those skilled in the art of digital circuit design will readily recognize such constraints and be able to appropriately organize the circuitry.

FIG. 5 illustrates an alternate memory arrangement wherein the motion information and the video signal are stored in the same memory element. Assume that the video signal is formatted in 910 samples per horizontal line and that frame memory 72 is designed to accommodate 910 samples per horizontal line. At least 7.8 microseconds (NTSC) of each line contain no video information, i.e. in the horizontal sync and burst etc., interval. This corresponds to approximately 110 sample periods. These sample locations in memory 72 may be utilized to store the motion history bits.

Assume also that the video samples are eight bits wide. Thus, there are 880 memory bits available for the motion information in the non-video portion at the beginning of each line, which is more than sufficient to store the motion signals. In order to multiplex the motion information with the video samples, the motion bits must be buffered and converted to eight-bit parallel format.

Referring to FIG. 5, shifter register 78 is the buffering element. During the active video periods, motion bits from the motion detector are applied to the input of shift register 78 via multiplexer 80. At the end of an active line period, shift register 78 contains all of the motion bits for the line. During the inactive portion of the next line, the contents of register 78 are applied to the serial-to-parallel converter 76 which concatenates the single-bit data stream to eight-bit samples that are applied to the input of frame memory 72 via multiplexer 70. When these motion bit samples are being read into memory 72, corresponding motion bit samples from the next horizontal line of the preceding frame are output from memory 72. The motion samples output from memory 72 are applied to the parallel-to-serial converter 74, converted from eight-bit samples to a single-bit stream and are loaded in register 78 via multiplexer 80. At the beginning of the active video portion of the next line of the current frame, shift register 78 contains the motion history bits for the current line and these motion bits are applied on e.g. a pixel-by-pixel basis to the logic element.

During the active video portion of each line the video samples are applied to frame memory 72 by multiplexer 70. Multiplexers 70 and 80 are controlled by a clock signal $\phi_M$ which may be developed by a digital one-shot triggered from horizontal sync. Shift register 78 is clocked at the sample rate by the sample clock during the active portion of video. When the contents of register 78 are being loaded into memory 72, register 78 is clocked at eight times the sample rate in order to form eight-bit samples in a single sample period. The eight-times clock signal is generated in clock generator 82. Clock generator 82 alternately applies the one-times and the eight-times sample rate clock to register 78 under the control of clock $\phi_M$.

An alternate to the foregoing memory arrangement is simply to expand the memory 18 sample bit-width and to concatenate the motion bits to the video samples.

The foregoing description has been in reference to a recursive noise reduction system having a single scaling circuit (14 or 44) for proportioning the current and delayed constituent signals. The invention, however, is equally applicable to recursive filters which, for example, employ separate scaling circuits in the current and delayed signal paths to which the scale factors K and 1−K are applied respectively.

What is claimed is:

1. In a recursive filter system for filtering video signal, including means for delaying said video signal by one image period and means for scaling and combining said video signal and said delayed video signal from said delaying means, to produce recursively filtered output signals, apparatus for generating scale factors to be applied to said scaling means, comprising:

a motion detector including means for determining the difference between said video signal and said delayed video signals and comparing means responsive to said differences for generating a motion signal indicative of the occurrence of image motion between pixels of a current image period and a previous image period when the magnitude of said differnce exceeds a predetermined value;

means coupled to said motion detector for delaying said motion signal by substantially one image period to produce delayed replicas of said motion signal;

a decoder responsive only to said motion signal and said delayed replicas of said motion signal for selecting signals corresponding to said scale factors, for application to said scaling means from a predetermined set of predetermined arbitrary values, each of said arbitrary values being determined in relation to a particular number of frame segments since the lastmost detection of motion.

2. The system set forth in claim 1 wherein the decoder includes logic elements and generates signals corresponding to the scale factors 1 for motion detected in the current image period, ½ for no motion detected in the current image period and motion detected in the image period immediately preceding the current image period, and $K_n$ for no motion detected in the current and immediately preceding image periods, where $K_n$ is less than one and proportional to a reciprocal multiple of 2.

3. The system set forth in claim 1 wherein the decoder includes a ROM having address input connections coupled to said motion and delayed motion signals and programmed to develop output signals corresponding to desired scale factors in response to the motion and delayed motion signals.

4. The system set forth in claim 1 wherein the means for delaying said motion signal includes means for delaying said delayed motion signal to produce a twice delayed motion signal and said decoder is further responsive to said twice delayed motion signal.

5. The system set forth in claim 1 wherein the means for delaying said motion signal includes said means for delaying said video signal, and buffer memory means for time division multiplexing the motion signal with the scaled and combined video signal during non-image periods of each video line.

6. A recursive filter for noise reducing video signal occurring in frame segments, comprising:

an input terminal for applying said video signal;

a subtracter having a minuend input port, a subtrahend input port and an output port;

a scaling circuit having a control input port for varying a scale factor of said scaling circuit, having an input port coupled to the output port of said subtracter, and having an output port;

an adder having a first input port coupled to the output port of said scaling circuit, having a second input port and an output port;

storage means having an input port coupled to the output port of the adder, having an output port coupled to the second input port of said adder and to one of said minuend and subtrahend input ports of said subtracter, said storage means for delaying signal applied thereto by substantially the period of one frame segment;

means for coupling the other of said minuend and subtrahend input ports to said input terminal;

detection means having an input port coupled to the output port of said subtracter and having an output port, for generating logic signals indicating interframe image motion, when magnitudes of differences applied to its input port exceed predetermined values;

delay means coupled to said detection means for delaying said logic signals by substantially a multiple including one, of the period of one frame segment, and having an output port;

a decoder coupled to said detection means and said delay means output ports, and responsive only to said logic signals and delayed logic signals for generating control signals corresponding to scale factors, which control signals are applied to the control input port of said scaling means, said decoder generating said control signals confined to a predetermined set of predetermined arbitrary values, each of said arbitrary values being determined in relation to a particular number of frame segments since the lastmost detection of motion.

7. The filter set forth in claim 6 wherein said detection means includes comparing means to generate a one bit logic signal having a first state when said differences exceed a predetermined magnitude and a second state otherwise.

8. The filter set forth in claim 7 wherein said storage means includes buffer memory and means for time division multiplexing said logic signals in said storage means during non-image intervals of said video signal.

9. The filter set forth in claim 6 wherein said scaling means includes a bit-shifter for shifting the bit significance of signal applied thereto.

10. The filter set forth in claim 6 wherein the decoder includes combinatorial logic.

11. The filter set forth in claim 6 wherein the decoder includes a ROM having an address input port coupled to said detection means and said delay means and an output port coupled to the control input port of said scaling means.

* * * * *